US006813762B1

(12) United States Patent
Plaxton

(10) Patent No.: US 6,813,762 B1
(45) Date of Patent: Nov. 2, 2004

(54) METHOD FOR PROCESSING PROGRAM FILES IN A PROGRAMMING LANGUAGE CAPABLE OF DYNAMIC LOADING

(75) Inventor: Iris M. Plaxton, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 09/507,910

(22) Filed: Feb. 22, 2000

(51) Int. Cl.[7] .............................. G06F 9/45; G06F 9/44
(52) U.S. Cl. ...................... 717/148; 717/139; 717/141; 717/146; 717/165
(58) Field of Search ................................ 717/148, 165, 717/139, 141, 146

(56) References Cited

U.S. PATENT DOCUMENTS

| | | | | |
|---|---|---|---|---|
| 5,815,709 A | * | 9/1998 | Waldo et al. ............... | 712/300 |
| 5,815,718 A | * | 9/1998 | Tock ......................... | 717/166 |
| 5,920,720 A | * | 7/1999 | Toutonghi et al. .......... | 717/148 |
| 5,943,496 A | * | 8/1999 | Li et al. ..................... | 717/148 |
| 5,999,732 A | * | 12/1999 | Bak et al. ................... | 717/148 |
| 6,021,273 A | * | 2/2000 | Griesemer .................. | 717/148 |
| 6,061,520 A | * | 5/2000 | Yellin et al. ................ | 717/148 |
| 6,110,227 A | * | 8/2000 | Marcelais et al. .......... | 717/170 |
| 6,199,196 B1 | * | 3/2001 | Madany et al. ............. | 717/165 |
| 6,282,702 B1 | * | 8/2001 | Ungar ........................ | 717/148 |
| 6,308,317 B1 | * | 10/2001 | Wilkinson et al. .......... | 717/139 |
| 6,336,122 B1 | * | 1/2002 | Lee et al. ................... | 707/204 |
| 6,438,744 B2 | * | 8/2002 | Toutonghi et al. .......... | 717/118 |
| 6,446,254 B1 | * | 9/2002 | Chapman et al. ........... | 717/118 |
| 6,460,178 B1 | * | 10/2002 | Chan et al. ................. | 717/118 |

OTHER PUBLICATIONS

"PersonalJava™ 1.1 Application Environment Memory Usage Technical Note," pp. 1–8 (1998).
"PersonalJava and EmbeddedJava Development Tools," pp. 1–4 (2000).

* cited by examiner

Primary Examiner—Todd Ingberg
Assistant Examiner—Qamrun Nahar
(74) Attorney, Agent, or Firm—Joanna G. Chiu

(57) ABSTRACT

A method for processing program files by formatting the program file information for storage in permanent memory in a device memory, allowing later additions without requiring storage in dynamic memory. A mapping mechanism is used to allow references to previously processed files. In one embodiment, the mapping mechanism is a link file. The original preprocessing is typically done during manufacture and stores the programming for basic functionality in a device. Later user-specific functions are added by using the mapping mechanism and preprocessing just the use-specific code. Multiple program file units may be added to the application, where the application device either includes the preprocessing tool or has access to it from a desktop or other application. The preprocessing tool may be implemented in software or hardware, and may be resident on the application device or used via a desktop application.

42 Claims, 7 Drawing Sheets

FIG.1 -PRIOR ART-

METHOD FOR PROCESSING PROGRAM FILES IN A PROGRAMMING LANGUAGE CAPABLE OF DYNAMIC LOADING

FIELD OF THE INVENTION

This invention relates generally to processing of program files written in a high level-language, and specifically to program files written in a high-level programming language capable of dynamic loading.

RELATED ART

As the number and type of hand-held and other electronic devices increases, there is a corresponding increase in the applications that run on and interface with these devices, as well as an increase in the desired flexibility for the user to add special programs and functionality. These devices are sometimes referred to as "embedded devices," as they include a processor for executing instructions, special function units, and the instructions for providing the desired functionality. Embedded devices are typically stand alone devices, having their own power supply, but often include the capability to interface with other systems. For example, embedded devices such as cellular phones, pagers, and personal digital assistants (PDAs) typically include a central processing unit (CPU) for executing computer programs stored within the device and a battery allowing mobility. Subsequent to manufacture of an embedded device, individual users may desire to customize their device by adding special functionality or applications. It is desirable to use computer programs, or codes, written in a high-level programming language, such as Java™, a language developed by Sun Microsystems, Inc., which facilitate the later installation of user-supplied applications. Java is particularly attractive, as it is platform-independent, meaning that it is not specific to one operating system or hardware configuration.

One constraint in developing code for an embedded device is the limited amount of memory, which reduces the amount of code that a device is able to store and also impacts the computing capabilities of the device. A key goal in designing code for an embedded device is then to maximize memory efficiency and speed of installed applications. Currently, several methods of increasing the memory efficiency of embedded applications exist, however, these methods do not generally extend to the subsequent installation of additional applications by the user.

For ease of illustration, the Java programming language serves as an exemplar, however, the present invention is applicable to other programming languages as well. Several terms will be used herein with reference to a system having embedded Java program(s). Memory refers to Read Only Memory (ROM), writable memory, and readable-writable memory. Readable-writable memory may be Random Access Memory (RAM), Electrically-Erasable-Programmable Memory (EEPROM), Programmable Memory (PROM), including both One-Time PROM (OTPROM) and Erasable PROM (EPROM), FLASH Memory, etc. The term "dynamic memory" is used to refer to memory that is dynamically allocated and does not retain stored information or data when power is removed from the device, such as RAM. The term "permanent memory" is used to refer to memory that is treated as read-only during execution, and retains stored information or data when power is removed from the device, such as ROM.

Java in particular, is an object-oriented programming language that is portable, easy to program, and architecture-neutral. Object-oriented design focuses on the data, referred to as "objects," as well as the interfaces to the objects. The Java program is able to execute anywhere within a network including a variety of processing units and operating system architectures.

Java programs are both compiled and interpreted. Compilation is done once, where compiled Java programming code is referred to as "Java ByteCode" (JBC). The JBC is an intermediate language that is architecture-neutral or platform-independent. A Java interpreter parses and runs JBC instructions on a processor. Interpretation occurs each time the program is executed. A Java binary file, referred to as a class file, includes the JBC for a given program as well as supporting information, such as symbolic data. A class file, or program file, includes "items" or information about the class, such as fields, methods, JBC arrays, and a symbolic reference table. Specifically, a Java program is composed of one or a set of Java files, which, on compilation, produce one or a set of class files.

JBC is effectively the machine code instructions for a "Java Virtual Machine" (Java VM). Every Java interpreter, such as a Java development tool or a Java-capable web browser uses an implementation of the Java VM. Often, these tools will either use the Java VM already installed on a system, or may come bundled with a Java VM. Note that the Java VM may also be implemented in hardware. In this way, the program may be compiled on any machine with a Java compiler and the resulting JBC may run on any implementation of the Java VM.

In order to make applications written in Java portable, much symbolic information is maintained. During normal Java VM execution of the JBC, the symbolic data is used by the Java VM to perform the dynamic binding whereby the actual pointer to the referenced structure is obtained. For example, each reference to a function is represented by the symbolic information: class name; function name; and signature. The class name identifies the class object containing the declaration of the method. The methods identify the various functions available for that class, and the JBC arrays are programs executed to implement a method. The function name, together with the signature, identifies the given function within its class. The signature describes the member and type of arguments passed to and returned by a function. The symbolic information expands the size of the Java binary file which creates memory storage problems. During execution, two (2) copies of the JBC and the symbolic information are maintained: a first copy is stored in permanent memory; and a second copy is stored in dynamic memory in a format easily manipulated by the Java VM. For small embedded devices, such as pagers, cellular phones, and PDAs, dynamic memory is very limited. It is, therefore, desirable to reduce dynamic memory usage. An additional problem is latency during execution due to the use of costly table lookups for handling symbolic references.

To address some of these problems, tools allow for compacting and formatting of Java class files to more efficiently use memory. "Pre-internalization" is a process of reformatting Java class file information into a format that, when placed in memory, represents a class object. Internalization occurs during loading of a class file and is the process of extracting the class information from a class file and storing the information in structure(s) in dynamic memory. The pre-internalization process eliminates symbolic references and class loading, reducing dynamic memory storage requirements. The format of the pre-internalized file is specific to each Java VM implementation.

Pre-internalization occurs after compilation but prior to normal loading and execution of the JBC. Pre-internalized class objects are restructured to eliminate the need to store them in dynamic memory, and are maintained in permanent memory. This frees more of the dynamic memory for creation of dynamic objects during execution. Information and structures used to maintain state preservation, as well as dynamic objects, are stored in what is referred to as the "Java heap". A problem exists with pre-internalization as storing class information in permanent memory eliminates the ability to update this information during execution.

Current solutions avoid storing the symbolic information in dynamic memory by requiring that all symbolic references be resolved prior to class installation on the target device. Resolving references involves replacing the A reference with the location of the referenced item, i.e. an address. A problem exists in pre-internalizing a set of class files, or "class file unit," where a reference is made to classes already installed on the device and for which the location of the referenced item is either unknown or unreliable. To avoid duplicating the referenced class information, the installed classes are removed from the device and repackaged with the set of new files.

As discussed herein above, each set of class files has an associated table of symbolic references, referred to as a "Constant Pool" (CP) or a symbol table. The CP of the class file unit is a composite of the individual CPs for each class in the class file unit. The CP of a class file unit may be referred to as a "shared CP." A JBC instruction, part of a JBC array, may include a reference, in the form of an index, to an entry in the shared CP of the class file unit. Once a class is pre-internalized, the CP contains the item address in a corresponding location.

FIG. 1 illustrates a prior art program file format. As illustrated, program file unit 2, includes two (2) program files labeled "Class 1" and "Class 2," respectively, and a shared symbol table, shared CP 4. Each program file, Class 1 and Class 2, has associated elements including fields, methods, and binary code. The binary code is the JBC array or bytecode array. Within each program file, Class 1 and Class 2, the methods are mapped to specific JBC arrays which implement the corresponding method. A JBC array then includes reference(s) to locations within shared CP 4. These references from the JBC array to the shared CP 4 are symbolic references. For clarity in the Figures, symbolic references are indicated by dashed lines with directional arrows, while actual locations are identified by solid lines with directional arrows. Each program file, Class 1 and Class 2, has an actual reference to the address of the shared CP 4. Similarly, entries in the CP 4 have actual references to the location of methods and fields in each program file. A first entry in the shared CP 4 is typically reserved, indicated in FIG. 1 by the hatched lines.

As illustrated, one JBC array may include references to multiple locations in CP 4, by way of an index. The Java VM takes the entry of the indexed location in the shared CP and identifies the access address. The entries in CP 4 identify fields, methods, or other program files within program file unit 2. Program file units may include any number of program files, which may be grouped according to a variety of schemes, typically to facilitate a given application.

FIG. 2 illustrates a prior art method of processing program files, also referred to as class files. Program files 8, labeled "Class 1," "Class 2," and "Class 3," are each similar to the program files of FIG. 1. Preprocessor 10 loads the program files 8 and generates formatted class file information 12. The formatting converts each program file, Class 1, Class 2, and Class 3, to class objects for use during execution, where the class objects are specific to the JVM implementation used. Preprocessor 10 is a tool that may be implemented in software or hardware. The formatted class file information 12 is structured for storage in a target device, where the device has both dynamic and permanent memory. The compiler and linker 16 combines the formatted class file information 12 with the Java VM source code 14. The Java VM source code 14 is specific to the Java VM implemented in the target device. The output of the compiler and linker 16 is the Java VM image 18, which has two portions: a first stores the Java VM 19; and a second stores preloaded class information 20. The preloaded class information 20 is the compiled version of the formatted class file information.

At this point, the Java VM image 18 is stored in device memory 22 of the target device. In this case, the device memory 22 includes dynamic memory 26, and permanent memory 24. In one embodiment, the dynamic memory 26 is implemented with RAM and the permanent memory 24 is implemented with ROM and/or FLASH memory. The dynamic memory 26 is used during execution for storing interim values and variables. The permanent memory 24 includes multiple portions: a first portion 28 for storing a class loader; a second portion 30 for storing a JBC interpreter; and a third portion 32 for storing the preloaded class information 20. The class loader of portion 28 is used for formatting binary class information for use by the Java VM, and is not required for preloaded program files 20, as they were formatted during preprocessing and compilation. The Java VM image 18 stored in the device memory 22 is used to run the Java program files, Class 1, Class 2, Class 3 in program file unit 8. The device memory 22 is then implemented within a device, such as a hand-held device or other application.

It is often desirable to add additional program files to the Java VM image in the device memory 22. Often the program file unit 8 describes basic functionality for an application, but the user is free to add supplemental functionality, such as user-specified or application-specific additions that enhance the device. There are several ways to add program files. In a first prior art method, the process 6 is performed again with the additional program files included with the program file unit 8. The resultant Java VM image 18 then includes the preloaded class information for all the program files, those in program file unit 8 plus the additional ones. This method is not flexible as it requires either the user to return to the manufacturer to have the new program files included in the processing, or the manufacturer to provide the program unit file 8 to the user and allow the user to perform the processing. According to a second prior art method, illustrated in FIG. 3, additional program files 42, including program files labeled "Class 4, "Class 5," and "Class 6," are stored in additional permanent memory 40, such as FLASH memory. The program files 42 are then loaded by the class loader stored in portion 28 of permanent memory 24 into dynamic memory 26 on execution. The need to store the loaded program files, Class 4, Class 5, and Class 6, in dynamic memory 26 reduces the space available for the Java heap. The loss of dynamic memory space creates a situation where even if all the program files 42 are stored in dynamic memory 26, the remaining available dynamic memory space is insufficient to store variables during execution, i.e the program cannot execute. Since dynamic memory space is typically limited, maximizing the amount of space available for the Java heap is crucial in many applications.

A need therefore exists for a method of processing program files that allows the addition of user-specific program files to basic functional program files without reducing the amount of dynamic memory available for execution.

BRIEF SUMMARY OF THE INVENTION

One embodiment of the present invention relates to a method for processing program files in a programming language capable of dynamic loading. The method includes receiving a first and a second program file, and generating a first program file unit having a first shared symbol table, a first formatted program file corresponding to the first program file, and a second formatted program file corresponding to the second program file. The first shared symbol table include references internal to the first program file unit, each element of the first shared symbol table has a corresponding index, and each of the first and second formatted program files include at least one reference to the first shared symbol table. The method further includes generating a first mapping mechanism, wherein the first mapping mechanism includes symbolic information corresponding to at least a portion of the indices of the first shared symbol table. The method further includes receiving a third program file, and generating a second program file unit having a second shared symbol table and a third formatted program file corresponding to the third program file, where the second program file unit is generated after the first program file unit is generated. The second shared symbol table is separate from the first shared symbol table, the second shared symbol table includes references internal to the second program file unit, each element of the second shared symbol table has a corresponding index, and the third formatted program file includes at least one internal reference to the second shared symbol table and at least one external reference to the first shared symbol table.

Another embodiment of the present invention relates to a preprocessor capable of processing program files in a programming language capable of dynamic loading including a first plurality of instructions for receiving a first and a second program file and a second plurality of instructions for generating a first program file unit having as first shared symbol table, a first formatted program file corresponding to the first program file, and a second formatted program file corresponding to the second program file. The first shared symbol table includes references internal to the first program file unit, each element of the first shared symbol table has a corresponding index, and each of the first and second formatted program files include references to the first shared symbol table. The preprocessor further includes a third plurality of instructions for generating a first mapping mechanism, where the first mapping mechanism includes symbolic information corresponding to at least a portion of the indices or the first shared symbol table, a fourth plurality of instructions for receiving a third program file, and a fifth plurality of instructions for generating a second program file unit having a second shared symbol table and a third formatted program file corresponding to the third program file, where the second program file unit is generated after the first program file unit is generated. The second shared symbol table is separate from the first shared symbol table, the second shared symbol table includes references internal to the second program file unit, each element of the second shared symbol table has a corresponding index, and the third formatted program file includes at least one internal reference to the second shared symbol table and at least one external reference to the first shared symbol table.

Yet another embodiment relates to a method for processing program files in a programming language capable of dynamic loading including receiving a first and a second program file and generating a first program file unit having a first shared symbol table, a first formatted program file corresponding to the first program file, and a second formatted program file corresponding to the second program file. The first shared symbol table includes references internal to the first program file unit, each element of the first shared symbol table has a corresponding index, and each of the first and second formatted program files include at least one reference to the first shared symbol table. The method further includes generating a first mapping mechanism, where the first mapping mechanism includes symbolic information corresponding to at least a portion of the indices of the first shared symbol table, receiving a third program file, and generating a second program file unit having a second shared symbol table and a third formatted program file corresponding to the third program file. The second shared symbol table includes references internal to the second program file unit, each element of the second shared symbol table has a corresponding index, and the third formatted program file includes at least one internal reference to the second shared symbol table and at least one external reference to the first shared symbol table. The method further includes storing the first program file unit in a permanent memory of a semiconductor device prior to generating the second program file unit.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The present invention provides a method of processing program files written in a high level-language capable of dynamic loading. The method preprocesses the program files to form both formatted program file information, and a mapping mechanism for later additions. The mapping mechanism allows access to an external shared CP, typically the shared CP of previously preprocessed program files. Access to the external shared CP is made by to "external references". The external references differentiate the external shared CP from local references to a local CP. Similar to a local reference, the external reference references an index of a target entry within the external shared CP. The Java VM is capable of handling such external reference, and uses the external reference to identify the entry in the external shared CP. During preprocessing, the program files are formatted to facilitate accesses from external references. Such formatting eliminates the need to know the actual storage location of the referenced program files on the device. This is applicable to systems and devices that move information, such as those having garbage collection with compaction. In one embodiment, the mapping mechanism is implemented using a link file. The link file maps references to a shared CP, allowing additional Java binary code to access the shared CP.

According to one embodiment of the present invention, application-specific program files are added by preprocessing using the link file created for the basic function program files, or any previously preprocessed program files. The link file provides the necessary mapping between earlier preprocessed files and later additions. The additional formatted program files are then stored in permanent memory rather than dynamic memory, helping to maximize the dynamic memory space available for dynamic variables during execution. The preprocessor may be part of a desktop computing unit having no direct access to information stored on the application device. Note that in alternate embodiments, the preprocessing may be done on the application device using a link file or other method of mapping.

Figure 1:
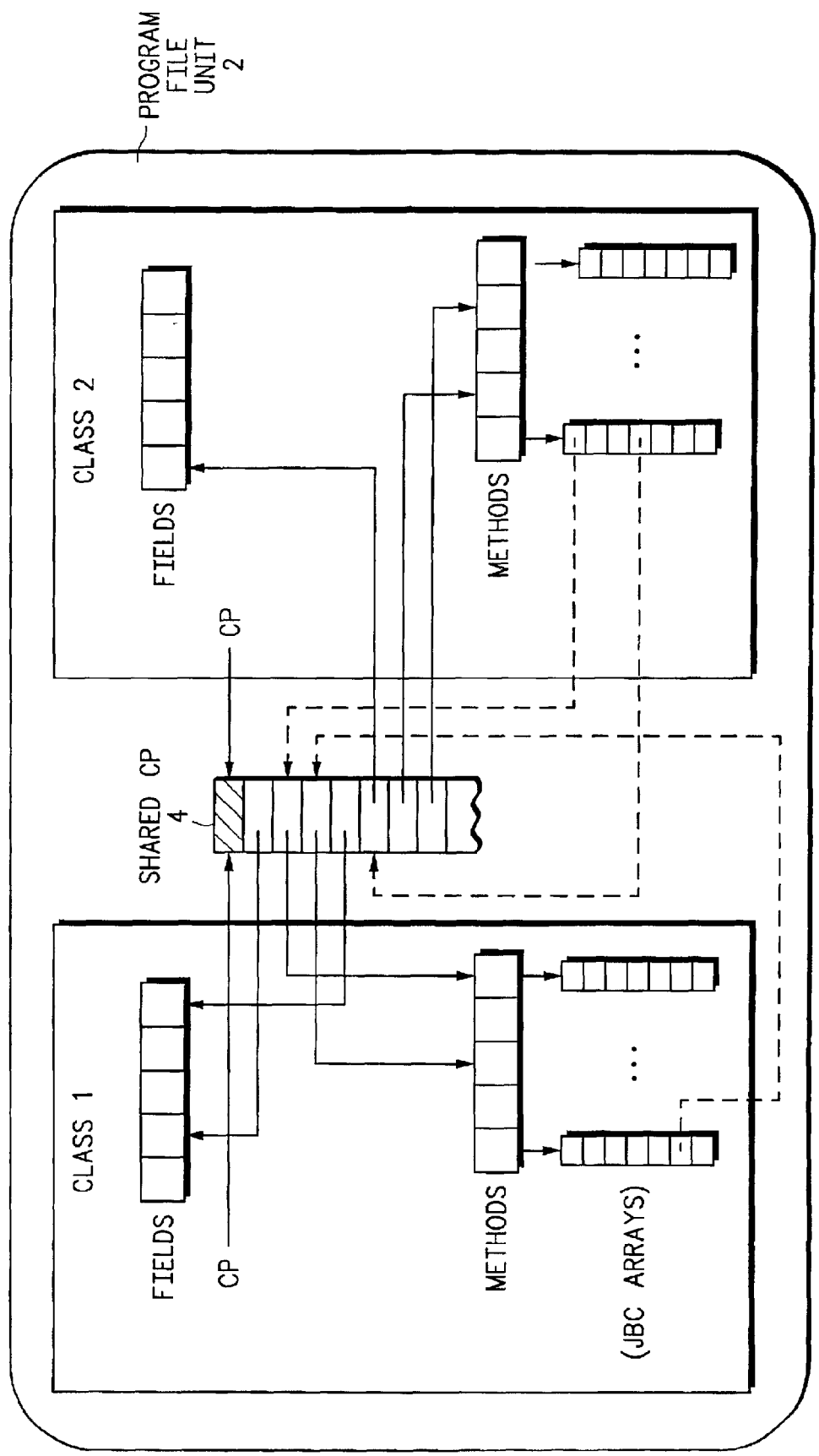
FIG. 1 illustrates in block diagram form a prior art program file unit format.
Figure 2:
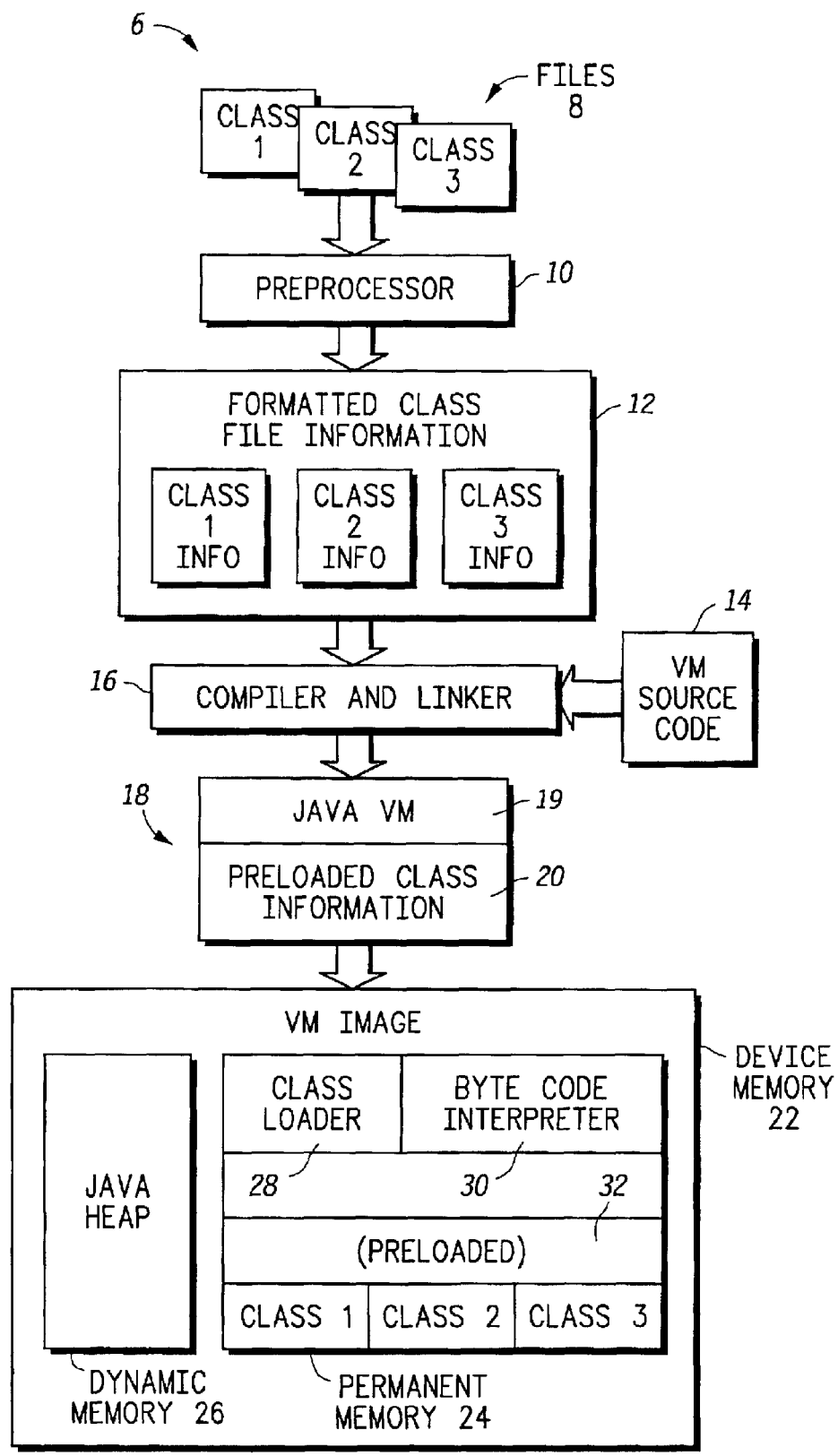
FIG. 2 illustrates in block diagram form a prior art method of processing basic function program files, as illustrated in FIG. 1, for storage in a device memory.
Figure 3:
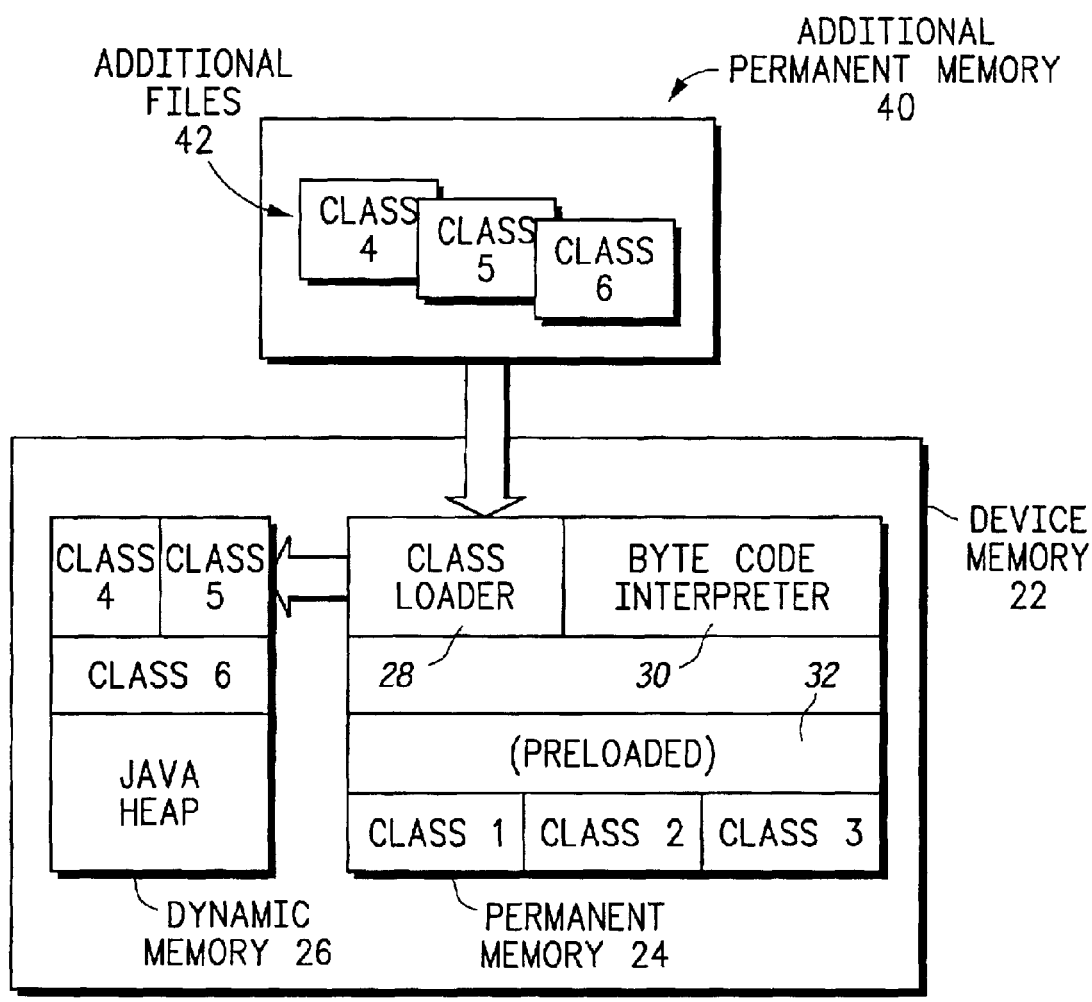
FIG. 3 illustrates in block diagram form a prior art method of adding application-specific program files to a device memory as in FIG. 2.
Figure 4:
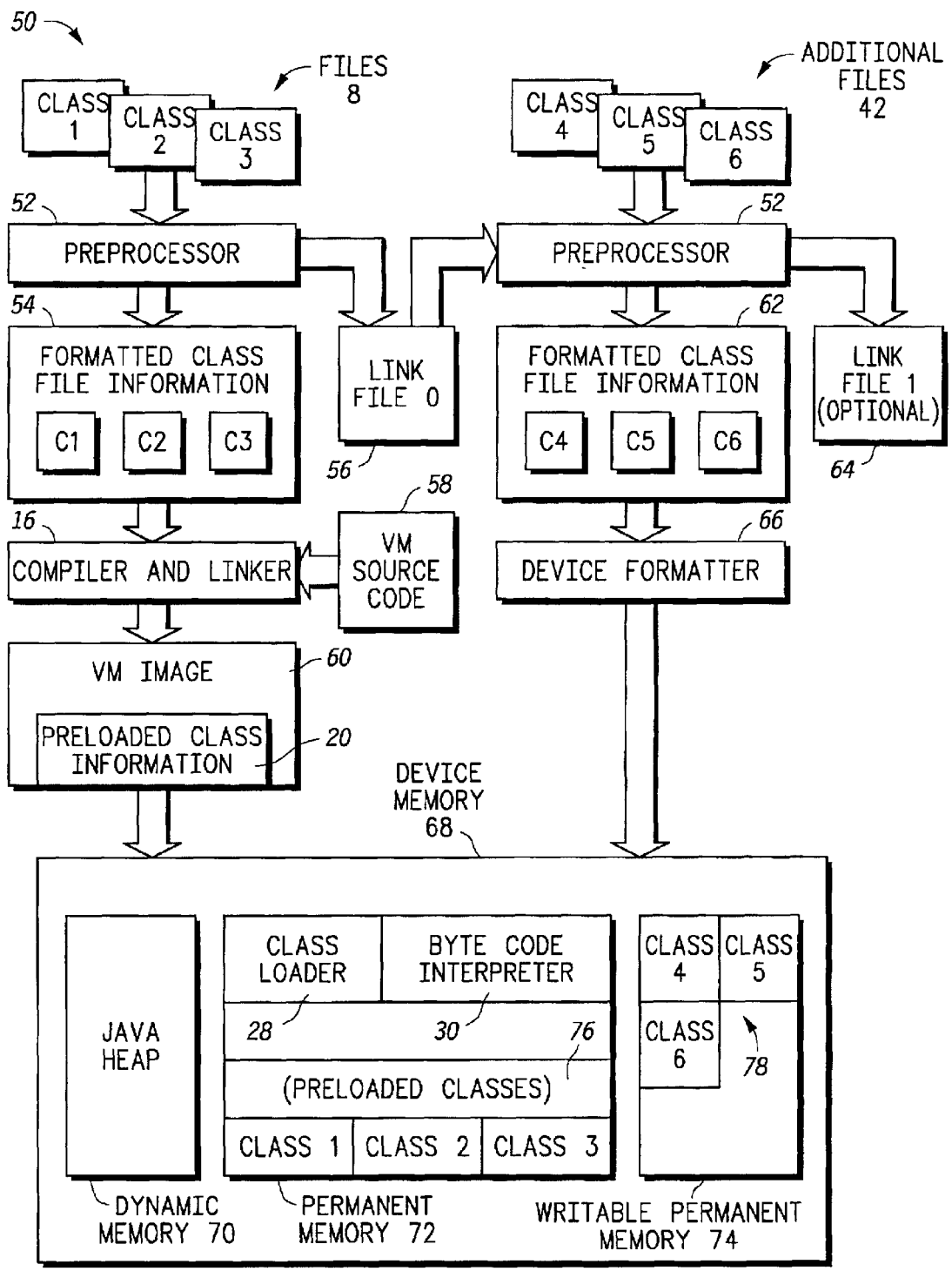
FIGS. 4 and 5 illustrate in block diagram form a method of processing basic function program files and additional application-specific program files according to one embodiment of the present invention.

FIG. 4 illustrates a method of processing program files according to one embodiment of the present invention. The initial program files 8 are processed by preprocessor 52, producing formatted program file information 54 having formatted program files and a shared CP, also illustrated in FIG. 5. The formatted program or class file information 54 is referred to as "Program File Unit 0." The shared CP includes references to each class object within the program files 8, labeled "C1," "C2," and "C3," as well as methods and fields within each program file. Note that C1, C2, and C3 are class objects. Each formatted program file includes at least one reference to the shared CP. Each element of the shared CP has a corresponding unique index. For efficient access, the order of references places the most frequently accessed references in the first slots. A unique identifier is associated with the shared CP to differentiate it from CPs associated with other class file units.

The preprocessor 52 provides a mapping mechanism that in the present embodiment, generates a link file 56 corresponding to the program files 8. The link file 56 is labeled "Link File 0" and includes symbol information corresponding to the indices of the shared CP. The Link File 0 resolves symbolic references in the shared CP. Information contained in the Link File 0 is available to the preprocessor 52 during subsequent processing. The Link File 0 preserves references accessible within program files 8 as well as locations in the shared CP. The Link File 0 contains sufficient information to uniquely identify each non-private item reference and its corresponding shared CP entry's index. The Link File 0 also contains a unique identifier associated with the shared CP of program files 8. Private references can be excluded from the Link File 0.

The compiler and linker 16 processes the formatted class file information 54, Program File Unit 0, with the Java VM source code 58 to form a Java VM image 60, including preloaded class information 20. The Java VM image 60 is then stored in device memory 68, having dynamic memory 70, permanent memory 72, and writable permanent memory 74. In the present embodiment, dynamic memory 70 is RAM, permanent memory is ROM, and writable permanent memory 74 is FLASH memory. The preloaded classes are stored in portion 76 within memory 72, which is ROM. Once the program information is stored in ROM, additional program files must be stored in another portion of memory, such as writable permanent memory 74.

The addition of application-specific program files is illustrated by the process flow starting with preprocessor 52 processing the additional files 42. Additional files 42 include program files labeled "Class 4," "Class 5," and "Class 6." During the preprocessing of additional files 42, the preprocessor 52 has access to the Link File 0 that was created during the preprocessing of files 8. The output of the preprocessor 52 is formatted class file information 62, having class objects "C4," "C5," and "C6." The preprocessor 52 also generates a link file 64, labeled "Link File 1." In an alternate embodiment, the Link File 1 is optional, and no link files are generated for further additional program files. Without Link File 1, or some other mapping mechanism, subsequent additional files will not be able to reference the additional files 42.

The formatted class file information 62 is provided to a device formatter 66, which formats the data for storage in device memory 68. Specifically, the formatted class file information 62, C4, C5, and C6, is stored in memory 74. The new additional program files 42 are now available for execution along with the basic function program files 8. An advantage of storing the new program files in permanent memory is that there is no penalty to the dynamic memory. The new files are stored in writable permanent memory 74, and the dynamic memory 70 has increased storage capacity for execution.

Figure 5:
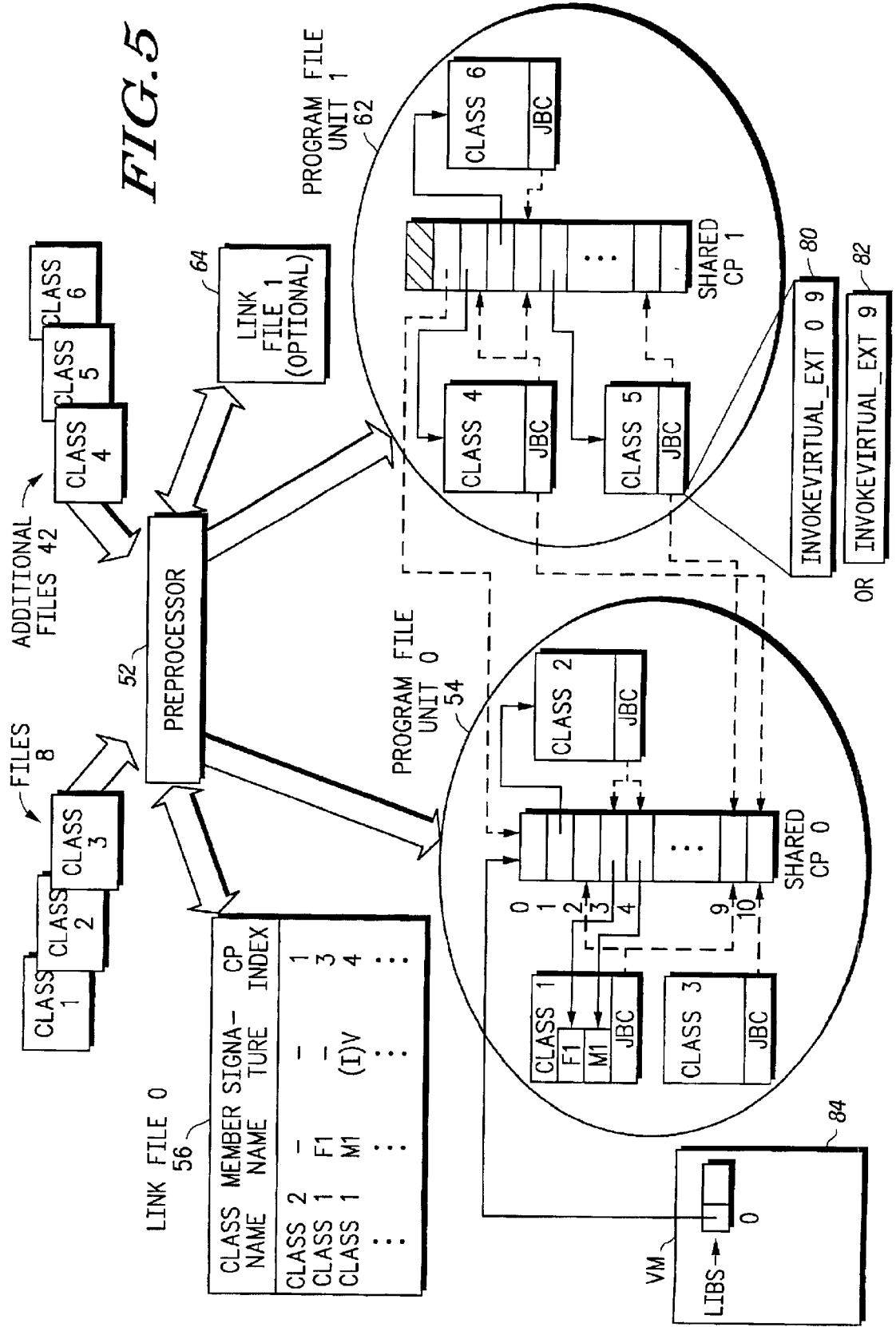

The formatted class file information 54 and 62 are further detailed in FIG. 5. When the basic function program files 8 are processed, the preprocessor 52 generates the Program File Unit 0. In this case, the preprocessor 52 assigns a reference number "0" to this program file unit. The Program File Unit 0 includes a class object for each of Class 1, Class 2, and Class 3, along with their shared CP, labeled "Shared CP 0." Each class file includes a field portion, a method portion, and a JBC array. In Program File Unit 0, a field for Class 1 is indicated by "F1" and a method by "M1." The shared CP 0 includes a plurality of indices referencing elements within Program File unit 0. As illustrated, the JBC array for Class 1 includes references to locations 2 and 9 in the shared CP 0; the JBC for Class 2 includes references to locations 3 and 4 in the shared CP 0; and the JBC for Class 3 includes a reference to location 10 in the shared CP 0. Location 1 in the shared CP 0 holds the address of the program file for Class 2. Location 3 holds the address for a field of Class 1, and the location 4 holds the address for a method of Class 1.

During processing, Link File 0 is generated by the preprocessor 52. The Link File 0 includes information specific to each class within Program File Unit 0, including class name, member name, type information (or signature), and CP index. The class name is the label, e.g. Class 1. The member name is the element within that class file, e.g. field, F1. The type information indicates the type of information used by an element, e.g. integer, I. The CP index refers to the indexed location in the shared CP which points to this element.

The addition of the program files 42, subsequent to processing of program files 8, is done through preprocessor 52, which generates program file unit 62, labeled "Program File Unit 1." Optionally, the preprocessor 52 generates Link File 1. Note that Link File 1 is utilized if other additional files are added subsequent to preprocessing of additional files 42. The Program File Unit 1 includes shared CP 1, and formatted information for Class 4, Class 5, and Class 6. Shared CP 1 contains references to items within Program File Unit 1, and also includes a reference to CP 0 of Program File Unit 0, i.e. an external CP.

During preprocessing, the preprocessor 52 uses Link File 0 to resolve references from Program File Unit 1 to program files within Program File Unit 0. The resolution involves referencing to indices in the external shared CP 0. This allows the subsequently added class files to reference prior processed class files. For example, the JBC array of Class 4 includes a reference to location 10 of shared CP 0 in Program File Unit 0. Within the JBC array, the reference to an "external" program file unit, i.e. one that is not within the present program file unit, is indicated as instruction 80. Note that each of the Program File Units with an exposed link file is considered a library, and for a system having only one (1) library, the instruction 82 may be used, as there is no need to identify which external CP is referenced. Both instructions, 80 and 82, refer to an indexed location within the external CP. The instruction 80, "invokevirtual_ext 0 9" identifies this reference as external by the "ext" extension, identifies the shared CP as shared CP 0 in Class Unit 0, and identifies location 9 in the shared CP 0. Where only a single library is referenced, there is no need to include the external reference number in the instruction, as illustrated in instruction 82, "invokevirtual_ext 9," and CP 0 is assumed.

Additionally, the Java VM includes a method of identifying specific Program File Units. A reference block 84 is provided to map external CPs. In this example, the index location 0 identifies shared CP 0. The Java VM interprets external references to index 0 as references to shared CP 0.

In an alternate embodiment, the byte code instruction does not include the extension information, but rather refers to a predetermined entry in the local CP, where that entry is recognized as an external type reference and includes an identifier or pointer to the correct Program File Unit. That local CP entry, therefore, identifies both the external shared CP as well as the index in the external shared CP. Alternate embodiments of the present invention may map the file unit to a shared CP in a variety of ways, so as to identify the external shared CP, as well as the entry in that shared CP. A mapping method should maintain the shared CP identification and entry identification.

Continuing with FIG. 5, external references from program file unit 62 to Program File Unit 0 are made by modifying the shared CP 1 to include the unique identifier of CP 0. This identifier is used by the Java VM to dynamically generate a pointer to the CP 0. The symbolic reference is indicated from the second entry in shared CP 1 to the shared CP 0. The identifier allows JBC arrays within Program File Unit 1 to reference external items within Program File Unit 0. As all the items in the Program File Unit 0 are fully resolved, the Java VM has an actual pointer to the item's structure in memory. During execution, the Java VM interpreter dereferences the item using the CP pointer resolved during the loading process.

Figure 6:
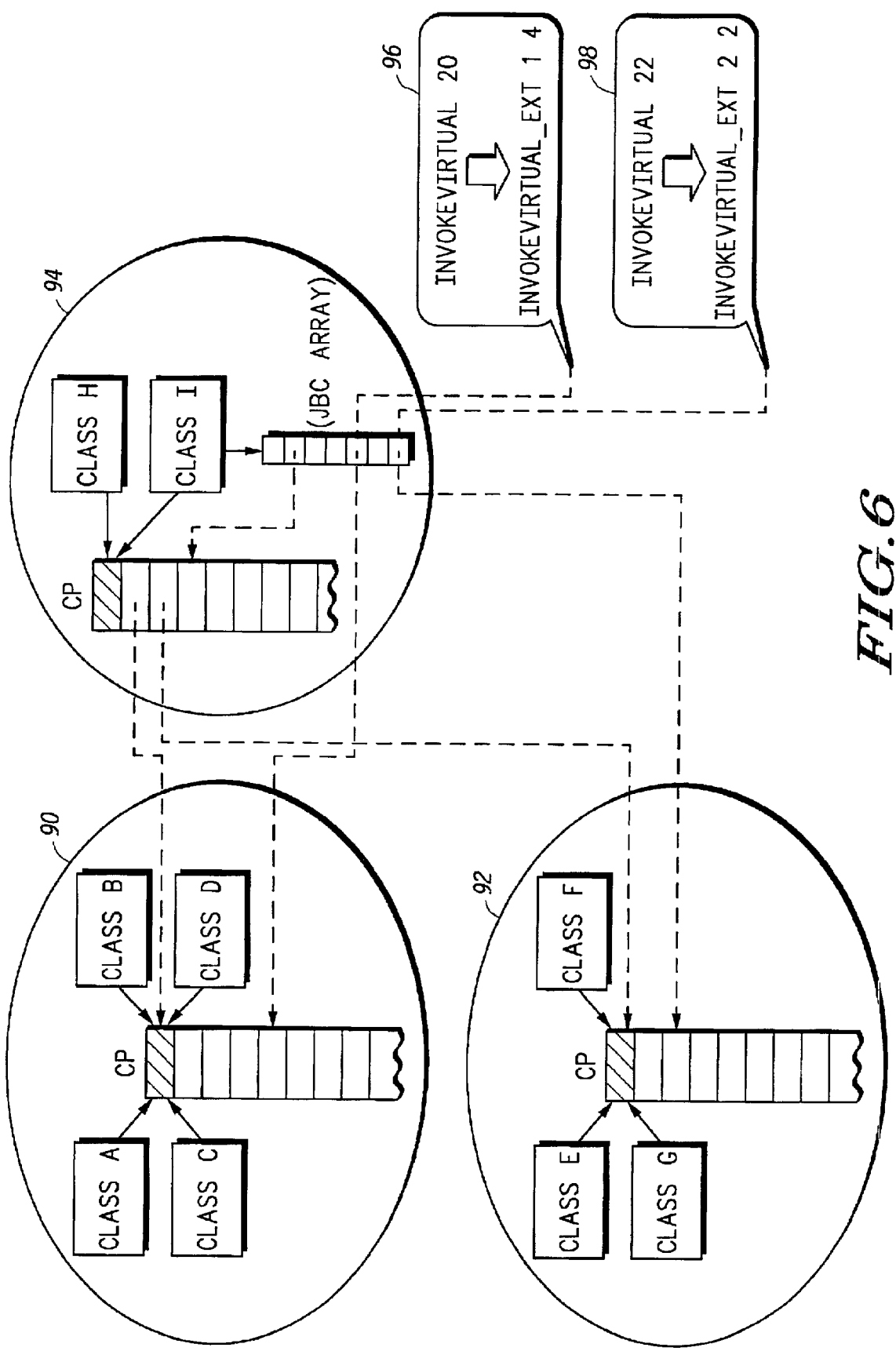
FIG. 6 illustrates in block diagram form a program file unit format according to one embodiment of the present invention.

Further additions may be made to the application, as illustrated in FIG. 6, where each additional program file may reference the CP of any previously processed program file units. After processing, program file units 90, 92, and 94, each include fields, methods, a shared CP and a JBC array. In this example, the program file unit 94 was added last, and therefore, it has references to program file units 90 and 92. Similarly, there are no references from previously processed program file units, 90 and 92, to program file unit 94. Note that for program file unit 94 to reference a previous program file unit, such as 90, that previous program file unit must have generated a link file or other mapping mechanism during preprocessing, assuming the preprocessor does not have direct access to the class units loaded on the device.

As illustrated, program file unit 94 includes a reference to program file unit 92, indicated as "Invokevirtual_ext 2 2" where the program file unit 92 is assigned reference number 2, and the reference is to index 2. Alternate embodiments may alter the order of the information listed in the instruction, where the CP index and identifier may be in reversed order, etc. Therefore, as illustrated in block 96, the internal reference "invokevirtual 20" is replaced with an external reference. The program file 94 includes a reference to program file unit 90, indicated as "Invokevirtual_ext 1 4" where program file unit 90 is assigned reference number 1, and the reference is to index 4. Here, as shown in block 98, the internal reference "invokevirtual 22" is also replaced with the external reference. In, one embodiment, the first entry in the CP of program file unit 94 is reserved, the second entry identifies the shared CP of program file unit 90, and the third entry identifies the shared CP of program file unit 92. In order to effect these references, preprocessing of program files labeled Class H and Class I required a mapping mechanism to the class name, type, and signature information of the referenced program files. If link files were generated during preprocessing, then program file unit 94 would use the link files for each of program file units, 90 and 92, for preprocessing the program files associated with program file unit 94. In this way, additional class units may be added while retaining references to previously processed libraries.

Figure 7:
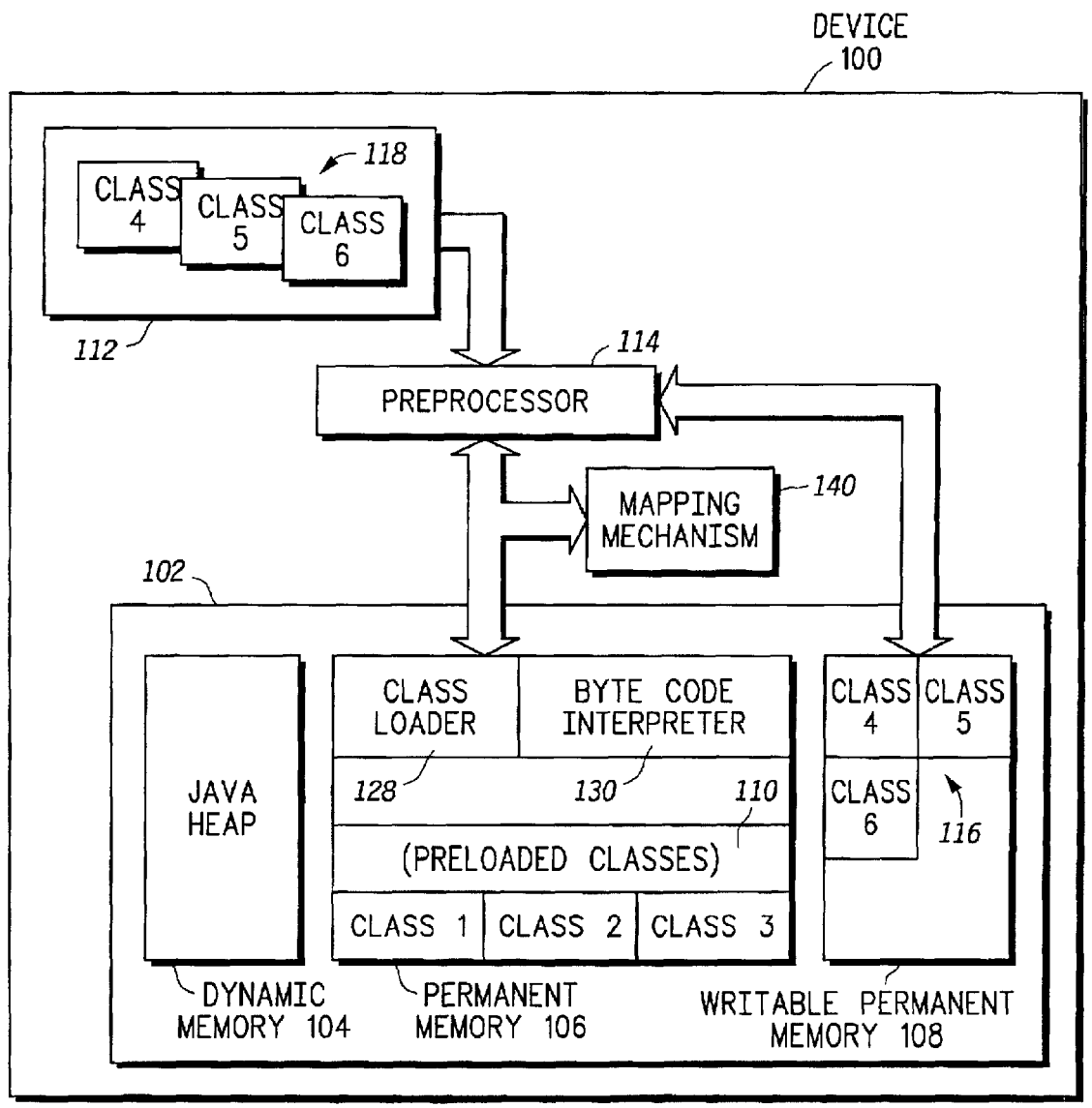
FIG. 7 illustrates in block diagram form a device capable of processing a program according to one embodiment of the present invention.

FIG. 7 illustrates one embodiment of the present invention having a preprocessor (such as preprocessor 52) resident on an application device 100. The device 100 includes a device memory portion 102, having dynamic memory 104, permanent memory 106, and writable permanent memory 108. The permanent memory 106 includes a class loader 128, a byte code interpreter 130, and preloaded class information associated with basic function program files (not shown). The preprocessor 114 is also resident on device 100, as well as a mapping mechanism 140. Additional files 118 are stored in memory 112 on the device 100. Note that additional files 118 may be added from external to the device, or may be resident on the device after manufacture. The preprocessor 114 preprocesses additional files 118 and generates formatted class file information 116. The preprocessor 114 also uses the mapping mechanism 140 to allow external references from formatted class files 116 to preloaded class files 110. In one embodiment, the mapping mechanism 140 also generates information sufficient to allow addition of files subsequent to additional files 118.

Class files 118 are temporarily buffered on device 100 for use by the preprocessor 114. Once the class file information is retrieved and reformatted, the class files 118 no longer need to reside on the device. The preprocessor 114 interacts with the Java VM utilizing the class loader 128 to access the preloaded class information 110, and to properly format the additional classes of files 118. The formatted classes 116 are then stored in writable permanent memory.

The present invention provides a method of preprocessing program file information that formats the information for storage in permanent memory in a device memory, allowing later additions without requiring storage in dynamic memory. A mapping mechanism is used to allow references to previously processed files. In one embodiment, the preprocessor also generates a link file that is used to allow references from subsequently preprocessed program files back to the earlier preprocessed program files. The original preprocessing is typically done during manufacture and stores the programming for basic functionality in a device. Later user-specific functions are added by using the link file or other mapping mechanism and preprocessing just the user-specific code.

Multiple program file units may be added to the application, where the application device either includes the preprocessing tool or has access to it from a desktop or other application. For example, additional function may be added to a hand-held PDA by interfacing with a preprocessing tool in a desktop computer. In other applications, the preprocessing tool is stored in the device itself. Alternate embodiments may implement other architecture-neutral high-level languages. The preprocessing tool may be implemented in software or hardware, and may be located within the device or a desktop processing unit. Any prior link files that are to be used by later application-specific files are accessible by or included in the tool. In one embodiment, portions of RAM are treated as permanent memory where the portion is read-only during execution of JBC.

In particular, embodiments of the present invention increases the available dynamic memory space by avoiding the storage of formatted class information in dynamic memory. The dynamic memory is then available for variables that change during execution.

In the foregoing specification, the invention has been described with reference to Java programming language and specific embodiments. However, one of ordinary skill in the art appreciates that various modifications and changes can be made without departing from the scope of the present invention as set forth in the claims below. For example, the present invention is applicable to other high-level programming languages that enable dynamic loading. Also, the software taught herein (such as a software implementation of preprocessor 52, for example) may be embodied on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for processing program files in a programming language capable of dynamic loading, comprising:
   receiving a first and a second program file;
   generating a first program file unit having a first shared symbol table, a first formatted program file corresponding to the first program file, and a second formatted program file corresponding to the second program file, wherein:
     the first shared symbol table includes references internal to the first program file unit;
     each element of the first shared symbol table has a corresponding index; and
     each of the first and second formatted program files include at least one reference to the first shared symbol table;
   generating a first mapping mechanism, wherein the first mapping mechanism includes symbolic information corresponding to at least a portion of the indices of the first shared symbol table;
   receiving a third program file;
   generating a second program file unit having a second shared symbol table and a third formatted program file corresponding to the third program file, wherein the second program file unit is generated after the first program file unit is generated and wherein:
     the second shared symbol table is separate from the first shared symbol table;
     the second shared symbol table includes references internal to the second program file unit;
     each element of the second shared symbol table has a corresponding index; and
     the third formatted program file includes at least one internal reference to the second shared symbol table and at least one external reference to the first shared symbol table.

2. The method of claim 1, wherein the first mapping mechanism is a first link file wherein the symbolic information includes fields related to class names, member names, signatures, and symbol table indices.

3. A semiconductor device having a virtual machine and including a device formatted version of the second program file unit generated by the method of claim 1.

4. The semiconductor device of claim 3, wherein the device formatted version of the second program file resides in a permanent memory of the semiconductor device.

5. The method of claim 1, wherein generating the second program file unit comprises:
   creating the second shared symbol table, wherein the second shared symbol table has a unique identifier,
   modifying the at least one internal reference of the third formatted program file to include a corresponding index of the second shared symbol table; and
   using the symbolic information of the first mapping mechanism to modify the at least one external reference of the third formatted program file to include a corresponding index of the first shared symbol table.

6. The method of claim 5, wherein the first shared symbol table has a unique identifier and the at least one external reference of the third formatted program file is modified to further include the unique identifier of the first shared symbol table.

7. The method of claim 5, wherein at least one element of the second shared symbol table includes a symbolic reference to an external program file unit referenced within the second program file unit.

8. The method of claim 5, wherein the program files include binary class files.

9. The method of claim 5, wherein the first and second shared symbol tables include shared constant pools.

10. The method of claim 5, further comprising:
storing the first program file unit in a permanent memory of a semiconductor device prior to receiving the third program file; and
storing the second program file unit in the permanent memory of the semiconductor device after modifying the at least one external reference of the third formatted program file.

11. The method of claim 10, wherein storing the first and second program file units further comprises device formatting the first and second program file units.

12. The method of claim 10, further comprising:
compiling virtual machine source code and the first program file unit, prior to receiving the third program file, to form a virtual machine image and a first program file unit image; and
storing the virtual machine image and the first program file unit image in the permanent memory of the semiconductor device.

13. The method of claim 12, wherein the virtual machine image is capable of distinguishing between internal and external references during execution of the program files.

14. The method of claim 10, wherein the first and second program file units are not stored to a dynamically allocated memory of the semiconductor device.

15. The method of claim 5, further comprising:
generating a second mapping mechanism, wherein the second mapping mechanism includes symbolic information corresponding to the indices of the second shard symbol table.

16. The method of claim 15, wherein the symbolic information of the second mapping mechanism represents public references.

17. A semiconductor device capable of performing the method of claim 1.

18. A computer readable medium comprising a plurality of instructions for implementing the method of claim 1.

19. The method of claim 1, wherein the symbolic information of the first mapping mechanism represents public references.

20. The method of claim 1, wherein the program files include binary class files.

21. The method of claim 1, further comprising:
storing the first program file unit in a permanent memory of a semiconductor device.

22. The method of claim 21, wherein the permanent memory is one of a read only memory (ROM) and a flash memory.

23. The method of claim 1, wherein the first shared symbol table is not modified during generating the second program file unit.

24. The method of claim 23, wherein generating the second program file unit comprises:
creating the second shared symbol table;
modifying the at least one internal reference of the third formatted program file to include a corresponding index of the second shared symbol table; and
using the symbolic information of the first mapping mechanism to modify the at least one external reference of the third formatted program file to include a corresponding index of the first shared symbol table.

25. A preprocessor capable of processing program files in a programming language capable of dynamic loading, comprising:
a first plurality of instructions for receiving a first and a second program file;

a second plurality of instructions for generating a first program file unit having a first shared symbol table, a first formatted program file corresponding to the first program file, and a second formatted program file corresponding to the second program file, wherein:
the first shared symbol table includes references internal to the first program file unit;
each element of the first shared symbol table has a corresponding index; and
each of the first and second formatted program files include references to the first shared symbol table; and
a third plurality of instructions for generating a first mapping mechanism, wherein the first mapping mechanism includes symbolic information corresponding to at least a portion of the indices of the first shared symbol table;
a fourth plurality of instructions for receiving a third program file; and
a fifth plurality of instructions for generating a second program file unit having a second shared symbol table and a third formatted program file corresponding to the third program file, wherein the second program file unit is generated after the first program file unit is generated, and wherein:
the second shared symbol table is separate from the first shared symbol table;
the second shared symbol table includes references internal to the second program file unit;
each element of the second shared symbol table has a corresponding index; and
the third formatted program file includes at least one internal reference to the second shared symbol table and at least one external reference to the first shared symbol table.

26. A semiconductor device containing the preprocessor of claim 25.

27. The preprocessor of claim 25, wherein the fifth plurality of instructions comprises:
a sixth plurality of instructions for creating the second shared symbol table;
a seventh plurality of instructions modifying the at least one internal reference of the third formatted program file to includes corresponding index of the second shared symbol table; and
an eighth plurality of instructions for using the symbolic information of the first mapping mechanism to modify the at least one external reference of the third formatted program file to include a corresponding index of the first shared symbol table.

28. The preprocessor of claim 27, further comprising:
a ninth plurality of instructions for storing the first program file unit in a permanent memory of a semiconductor device prior to receiving the third program file; and
a tenth plurality of instructions for storing the second program file unit in the permanent memory of the semiconductor device after using the symbolic information of the first mapping mechanism to modify the at least one external reference of the third formatted program file.

29. The preprocessor of claim 25, wherein the preprocessor does not modify the first shared symbol table during execution of the fifth plurality of instructions for generating the second program file unit.

30. The preprocessor of claim 29, wherein the fifth plurality of instructions comprises:

a sixth plurality of instructions for creating the second shared symbol table;

a seventh plurality of instructions for modifying the at least one internal reference of the third formatted program file to include a corresponding index of the second shared symbol table; and an eighth plurality of instructions for using the symbolic information of the first mapping mechanism to modify the at least one external reference of the third formatted program file to include a corresponding index of the first shared symbol table.

31. The preprocessor of claim 25, further comprising:

a sixth plurality of instructions for storing the first program file unit in a permanent memory of a semiconductor device prior to generating the second program file unit.

32. The preprocessor of claim 31, further comprising:

a seventh plurality of instructions for storing the second program file unit in the permanent memory of the semiconductor device after generating the second program file unit.

33. The preprocessor of claim 31, wherein the fifth plurality of instructions comprises:

a seventh plurality of instructions for creating the second shared symbol table;

an eighth plurality of instructions for modifying the at least one internal reference of the third formatted program file to include a corresponding index of the second shared symbol table; and a ninth plurality of instructions using the symbolic information of the first mapping mechanism to modify the at least one external reference of the third formatted program file to include a corresponding index of the first shared symbol table.

34. A method for processing program files in a programming language capable of dynamic loading, comprising:

receiving a first and a second program file;

generating a first program file unit having a first shared symbol table, a first formatted program file corresponding to the first program file, and a second formatted program file corresponding to the second program file, wherein:

the first shared symbol table includes references internal to the first program file unit;

each element of the first shared symbol table has a corresponding index; and each of the first and second formatted program files include at least one reference to the first shared symbol table;

generating a first mapping mechanism, wherein the first mapping mechanism includes symbolic information corresponding to at least a portion of the indices of the first shared symbol table;

receiving a third program file;

generating a second program file unit having a second shared symbol table and a third formatted program file corresponding to the third program file, wherein:

the second shared symbol table is separate from the first shared symbol table;

the second shared symbol table includes references internal to the second program file unit;

each element of the second shared symbol table has a corresponding index; and the third formatted program file includes at least one internal reference to the second shared symbol table and at least one external reference to the first shared symbol table; and storing the first program file unit in a permanent memory of a semiconductor device prior to generating the second program file unit.

35. The method of claim 34, further comprising:

storing the second program file unit in the permanent memory of the semiconductor device after generating the second program file unit.

36. The method of claim 34, wherein generating the second program file unit comprises:

creating the second shared symbol table;

modifying the at least one internal reference of the third formatted program file to include a corresponding index of the second shared symbol table; and using the symbolic information of the first mapping mechanism to modify the at least one external reference of the third formatted program file to include a corresponding index of the first shared symbol table.

37. The method of claim 36, wherein the first shared symbol table has a unique identifier and the at least one external reference or the third formatted program file is modified to further include the unique identifier of the first shared symbol table.

38. The method of claim 36, wherein at least one element of the second shared symbol table includes a symbolic reference to an external program file unit referenced within the second program file unit.

39. The method of claim 34, wherein the first shared symbol table has a unique identifier and the at least one external reference of the third formatted program file is modified to further include the unique identifier of the first shared symbol table.

40. The method of claim 34, wherein at least one element of the second shared symbol table includes a symbolic reference to an external program file unit referenced within the second program file unit.

41. A semiconductor device capable of performing the method of claim 34.

42. A computer readable mechanism comprising a plurality of instructions for implementing the method of claim 34.

* * * * *

UNITED STATES PATENT AND TRADEMARK OFFICE
CERTIFICATE OF CORRECTION

PATENT NO. : 6,813,762 B1  
APPLICATION NO. : 09/507910  
DATED : November 2, 2004  
INVENTOR(S) : Plaxton It is certified that error appears in the above-identified patent and that said Letters Patent is hereby corrected as shown below:

In Column 14, Line 44, Claim No. 27:

Change "includes" to --include a--

In Column 16 Line 35, Claim No. 37:

Change "or" to --of--

Signed and Sealed this

Eighteenth Day of December, 2007

JON W. DUDAS  
*Director of the United States Patent and Trademark Office*